United States Patent [19]
Sherman

[11] 3,794,294
[45] Feb. 26, 1974

[54] ADJUSTABLE VALVE FOR USE ON IRRIGATION PIPES

[76] Inventor: Roger M. Sherman, 3381 Stevens Creek Blvd., San Jose, Calif. 95117

[22] Filed: Apr. 23, 1973

[21] Appl. No.: 353,746

[52] U.S. Cl............... 251/145, 61/12, 251/351, 251/353, 137/625.3
[51] Int. Cl............................................. F16k 31/58
[58] Field of Search ... 251/145, 146, 349, 350, 351, 251/352, 353, 354; 61/12; 239/542; 137/625.3

[56] References Cited
UNITED STATES PATENTS

| | | | |
|---|---|---|---|
| 3,033,514 | 5/1962 | Glosch | 251/145 |
| 2,925,989 | 2/1960 | Hempel | 251/145 |
| 3,717,324 | 2/1973 | Milde | 251/145 X |
| 2,693,203 | 11/1954 | Hempel | 251/145 X |
| 2,771,904 | 11/1956 | Sherman et al. | 251/145 X |

*Primary Examiner*—William R. Cline
*Attorney, Agent, or Firm*—Allen & Chromy

[57] ABSTRACT

An adjustable valve for use on irrigation pipes to control the water flow from the pipe or to shut off the water flow. This device is provided with a valve member adjustable in a grommet, said grommet being flexible material. Said grommet fits into a hole in a flattened part of the irrigation pipe. The cylindrical valve member is provided with an external thread matching the internal thread of the grommet or it may have a round external surface in frictional engagement with the grommet. The valve may be of flexible material so that it may be deformed and inserted into the grommet and held by friction in a predetermined adjustment. The valve member is provided with an end wall that is received in a tapered recess of the grommet and forms a seal therewith when the valve member is in closed position. The valve member is provided with a plurality of apertures formed in the cylindrical walls thereof so that when the valve member is moved or pressed into the irrigation pipe some of these apertures are opened into the pipe to permit water to flow from the pipe into the hollow of the valve member and out thereof to irrigate the field.

3 Claims, 7 Drawing Figures

PATENTED FEB 26 1974 3,794,294

3,794,294

ADJUSTABLE VALVE FOR USE ON IRRIGATION PIPES

DESCRIPTION OF THE INVENTION

This invention relates to adjustable valves provided to an irrigation pipe to control the water flow therefrom.

An object of this invention is to provide an improved device for use on irrigation pipe to control the water flow therefrom.

Another object of this invention is to provide an improved water flow control device for irrigation pipe that may be easily and quickly adjusted to control the water flow therethrough.

Still another object of this invention is to provide an improved water flow control device for irrigation pipe that may be easily installed and readily adjusted and which is simple and economical to manufacture and install.

Another object of this invention is to provide an improved gated irrigation pipe construction in which the gates or valves are recessed so that they are protected particularly when the pipe is being transported or otherwise handled.

Still another object of this invention is to provide a gated irrigation pipe construction in which the valves or gates are made such that the energy of the water flow therethrough is dissipated through the change of direction of flow of the water in each gate so that the impact of the water on the ground to be irrigated is reduced resulting in a minimum of soil erosion.

Other and further objects of this invention will be apparent to those skilled in the art to which it relates from the following specification, claims and drawing.

Valve units heretofore used for controlling the water flow from irrigation pipe have not been entirely satisfactory. Some of these prior units employ a multiplicity of parts that are expensive to manufacture and furthermore do not provide a unit that is easy to adjust to control the water flow from the irrigation pipe. Others of the prior devices are difficult to adjust to provide a predetermined water flow so that adjustment thereof takes a great deal of time on the part of farmer's personnel charged with irrigating the fields.

In accordance with this invention I have provided a valve unit that may be economically and efficiently manufactured and furthermore it is easy to install and adjust. The valve device of my invention is made in two parts, one of the parts being a grommet of material such as rubber, or the like, which is provided with an annular recess for receiving the wall of the irrigation pipe. In one embodiment the grommet is provided with an internal thread for receiving the external thread of the adjustable valve member which may be of flexible material and is adapted to be deformed slightly so that it may be inserted into the grommet. In another embodiment the external surface of the valve member and internal surface of the grommet are round and in frictional contact. The helical thread of the first embodiment of the valve member is relatively coarse and a plurality of holes or apertures is provided between the convolutions thereof. Thus, when the valve member is open the water from the irrigation pipe flows out through these holes into the inside of the valve member and out to the field to be irrigated. The end walls of both types of valve members are provided with a peripheral flange that extends into an annular recess of the grommet when the valve is closed and reduces leakage.

Further details and features of this invention will be set forth in the following specification, claims and drawing:

Figure 2:
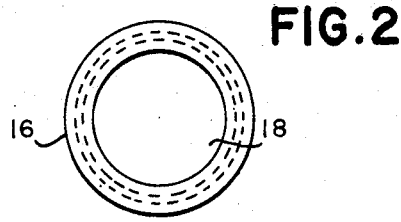
FIG. 2 is a top view of the valve shown in FIG. 1.

Referring to the drawing in detail, reference numeral 10 is a fragmentary sectional view of a conventional irrigation pipe made of material such as aluminum, galvanized iron, plastic, or the like. Pipe 10 is provided with a flattened portion having a round opening large enough to receive the grommet 12 which is of flexible material such as rubber or the like. The grommet 12 is provided with an annular recess 13 for receiving the lip of the hole formed in the flat portion 11 of the pipe. The grommet 12 is of flexible material so that it may be deformed when it is inserted into the hole and it springs to its normal shape when the lip of the hole is aligned with the recess 13. A helical groove 14 is provided on the inner surface of the grommet 12 for receiving the helical thread 15 of the valve member 16 so that the groove and thread are in frictional engagement. In one embodiment the valve member 16 is made of material such that it may be deformed enough to be inserted into the grommet and then it returns to its normal shape with the thread thereof engaging the grooves of the grommet. The valve member is provided with a bottom 17 and the top 18 thereof is open.

Figure 3:
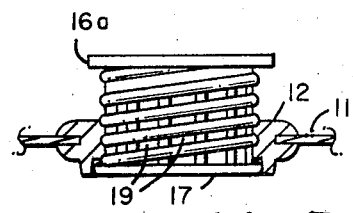
FIG. 3 is a side view of the valve shown in FIG. 1 illustrated in closed position.
Figure 1:
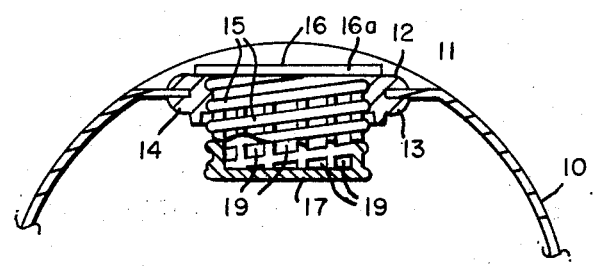
FIG. 1 is a sectional view of one valve embodiment of this invention installed in an irrigation pipe.
Figure 7:
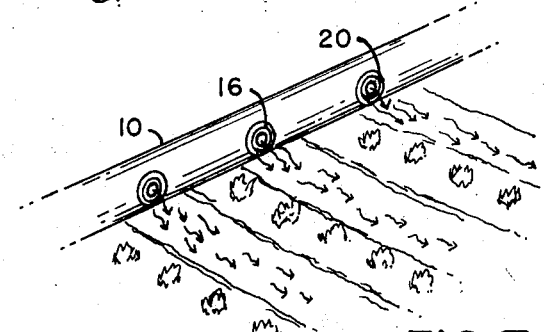
FIG. 7 is a view of a section of irrigation pipe with valves of this invention provided thereto.

A network of holes 19 is provided to the valve member 16 between the convolutions of the thread 15 so that when the valve member is positioned with these holes clearing the grommet 12 as shown in FIG. 1 the water from the inside of the irrigation pipe 10 may pass through the holes 19 and out of the open top 18 to irrigate the field around the pipe. The flow of water through the many holes 19 into the inside of the member 16 causes the water to change its direction of flow resulting in the loss of energy which helps to reduce the force of impact of the water on the ground to be irrigated and thus keeps soil erosion to a minimum. When it is desired to turn the water off, that is prevent it from flowing out of the pipe, the valve member 16 is turned until the bottom 17 thereof is against the recess formed in the bottom side of the grommet 12. The seal to shut off the valve is obtained by contact between the rim of the bottom 17 and the sloping surface of the conical recess in the grommet 12 as shown in FIG. 3. When the valve member is in this position the holes 19 are closed by the grommet 12 in that portion of the valve member that is opposite the grommet so that water can no longer flow out of the irrigation pipe through the holes 19. If it is desired to provide only a small water flow through the valve member 16 then this member may be adjusted so that only a limited number of the holes 19 is open into the interior of the irrigation pipe.

Figure 4:
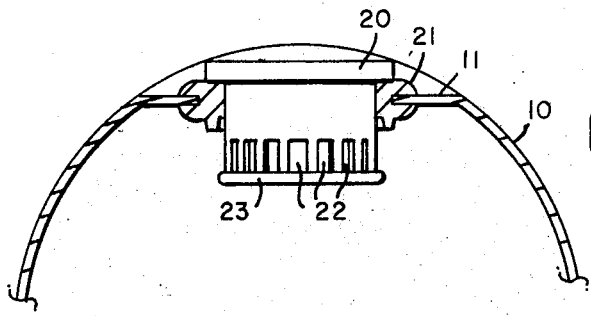
FIG. 4 is a side view of another embodiment of the valve mechanism showing the mechanism in open position.
Figure 6:
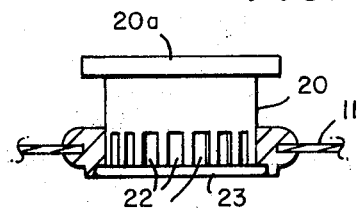
FIG. 6 is a view of the valve shown in FIG. 4 illustrating the valve in closed position.
Figure 5:
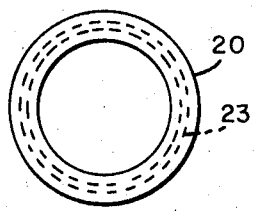
FIG. 5 is a top view of the valve mechanism shown in FIG. 4.

In the embodiment of this invention shown in FIGS. 4, 5, and 6, the irrigation pipe 10 is provided with a valve member 20 with a round side surface which frictionally engages the opposing round inner surface of the grommet 21. In both embodiments of this invention the workman desiring to move either of the valve members 16 or 20 into their open positions may do so readily without stooping down to the irrigation pipe level to operate the valve member by hand. The workman can simply hit the top of the valve member with a flat board or shovel and in this way force the valve member into its open position as shown in the drawing. The valve members 16 and 20 may be made either of tough, flexible material or of rigid material as desired.

The valve member 20 is provided with a plurality of holes 22 around the lower circumference thereof adjacent to the bottom 23. When the valve member 20 is in open position water flows from the pipe 10 through the holes 22 into the valve member and out thereof through the open top. A flange 20a is provided around the top circumference of the valve member and this flange extends over a portion of the top of the grommet 21 when the valve member is open. The flange 20a is made of sufficiently large size so that the workman can grip it conveniently when he desires to pull the valve member up into its closed position shown in FIG. 6. In this closed position the flange around the closed bottom of the valve member is lodged against the bottom of the grommet 21 in a recess provided to the grommet and the holes 22 are closed so that water can not flow out of the irrigation pipe therethrough.

While I have shown and described a preferred form of the invention, it will be understood that the invention is capable of variation and modification from the form shown so that its scope should be limited only by the scope of the claims appended hereto.

What I claim is:

1. A valve for controlling the flow of water from an irrigation pipe, the combination of a circular grommet of resilient material, said grommet having an annular recess in the circular outer surface thereof, said recess receiving the lip of a hole formed in a flattened part of the wall of an irrigation pipe, a hollow cylindrical valve member having an end wall forming the bottom thereof, said valve member having a plurality of holes in the cylindrical wall thereof adjacent to said end wall, said grommet having a circular inner surface in frictional engagement with the circular outer surface of said valve member so that said valve member is supported on said flattened wall of said pipe, said valve member being adjustable with respect to said grommet, said grommet closing said holes adjacent to said end wall when said valve member is adjusted so that said end wall is positioned in close proximity to the bottom of said grommet, said valve member having a top flange around the open top thereof, said valve member being adapted to be opened by a workman hitting said top flange and moving said valve member inward in said grommet so that said holes are opened into the inside of the irrigation pipe to allow water to flow out of said pipe through said holes.

2. A valve for controlling the flow of water from an irrigation pipe, the combination as set forth in claim 1, further characterized in that said substantially round outer surface of said valve member is provided with a rounded helical thread engaging a corresponding helical groove in the inner surface of said grommet, said grommet being of yieldable material so that said valve member may be pressed inward by applying axial pressure thereto without turning said valve member and said valve member may be moved into either position by turning it.

3. A valve for controlling the flow of water from an irrigation pipe, the combination as set forth in claim 1, further characterized in that the flattened part of the wall of the irrigation pipe is recessed into the pipe to protect the valve member during handling of the pipe.

* * * * *